United States Patent [19]
Tucker

[11] Patent Number: 5,987,712
[45] Date of Patent: Nov. 23, 1999

[54] CORD LOCK

[76] Inventor: John C. Tucker, 2921 Suffolk Ct. E., Suite 500, Fort Worth, Tex. 76133

[21] Appl. No.: 08/995,348

[22] Filed: Dec. 22, 1997

[51] Int. Cl.$^6$ ..................................................... F16G 11/00
[52] U.S. Cl. ....................... 24/136 R; 403/211; 24/115 M
[58] Field of Search .............................. 24/136 R, 136 L, 24/134 L, 115 R, 115 F, 115 M, 115 G, 712.5; 403/211, 213

[56] References Cited

U.S. PATENT DOCUMENTS

| | | | |
|---|---|---|---|
| 2,573,806 | 11/1951 | Paterson | 24/136 R X |
| 3,845,575 | 11/1974 | Boden | 24/136 R X |
| 3,953,144 | 4/1976 | Boden | 24/136 R X |
| 3,965,544 | 6/1976 | Boden | 24/136 R |
| 4,156,574 | 5/1979 | Boden | 403/211 |
| 4,665,590 | 5/1987 | Udelhofen et al. | 403/211 X |
| 5,435,044 | 7/1995 | Ida | 24/136 R |
| 5,454,140 | 10/1995 | Murai | 24/136 R |
| 5,737,808 | 4/1998 | Ikeda | 24/136 R X |

Primary Examiner—James R. Brittain
Assistant Examiner—Robert J. Sandy
Attorney, Agent, or Firm—Kenneth C. Hill

[57] ABSTRACT

An improved cord lock provides a mechanism for preventing a moveable slide from being drawn too far into a cord lock body by heavy forces transmitted through the cord being locked. The improved cord lock has a body of standard manufacture, and a moveable slide which has been modified to provide a positive stop to prevent the slide from entering too far into the body. The positive stop may be formed as a number of projections from the moveable slide which make its overall cross section too large to fit within the lock body.

15 Claims, 4 Drawing Sheets

CORD LOCK

BACKGROUND OF THE INVENTION

1. Field of the Invention

The present invention relates generally to locking mechanisms for cords, and more specifically to a releasable cord lock device which cannot be pulled too far in the locking direction.

2. Description of the Prior Art

Cords of various diameters are used to hold shut many different types of articles. Examples are laundry and garment bags.

To avoid having to tie and untie cords used for these purposes, various types of inexpensive locking devices have been designed. An example of one such device, which is typical within the industry, is shown in U.S. Pat. No. 4,156,574, issued to O. W. Boden. This patent describes in detail the mechanical structure of a particular cord lock design.

A cord lock of the type shown in the Boden patent is shown in FIG. 1. The cord lock 10 includes a hollow body 12 and a moveable slide 14. Two cord sections 16, 18 pass through the body 12, and are held in place by the slide 14. When the slide is moved to the left as shown in FIG. 1, the cords are locked into position. When the slide is moved to the right as shown in FIG. 1, the cords are released.

FIG. 2 illustrates a slide such as used in FIG. 1. The slide 14 has a finger loop 20 connected to a main portion 22 by neck 24. Gripping portions 26 are disposed on either side of the body 22 to hold the cords 16, 18 in position against the inside of the lock body 12. To further improve the gripping capacity of the device, feeler arms 28 are also provided to press the cords 16, 18 against the inside of the lock body 12. Operation of this device is described in further detail in the above described patent issued to Boden.

One problem with cord locks of this type is that very large pressures on the cord, to the left as shown in FIG. 1, can cause the slide 14 to be drawn into the lock body 12. If the slide is drawn too far into the lock body, it can become very difficult to disengage. Further, if this should happen while a user's finger is within the finger loop 20, injury can result.

It would be desirable to provide a cord lock which solves the problem of the slide being drawn too far into the lock body.

SUMMARY OF THE INVENTION

Therefore, in accordance with the present invention, an improved cord lock provides a mechanism for preventing a moveable slide from being drawn too far into a cord lock body by heavy forces transmitted through the cord being locked. The improved cord lock has a body of standard manufacture, and a moveable slide which has been modified to provide a positive stop to prevent the slide from entering too far into the body. The positive stop may be formed as a number of projections from the moveable slide which make its overall cross section too large to fit within the lock body.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
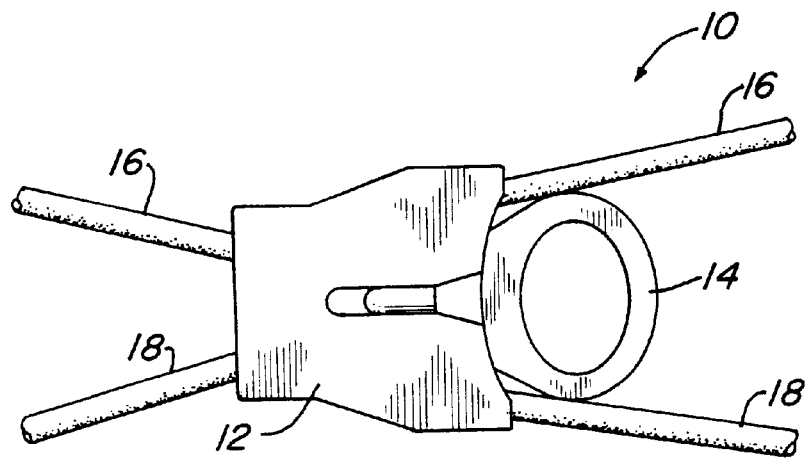
FIG. 1 is a front view of a prior art cord lock device.
Figure 2:
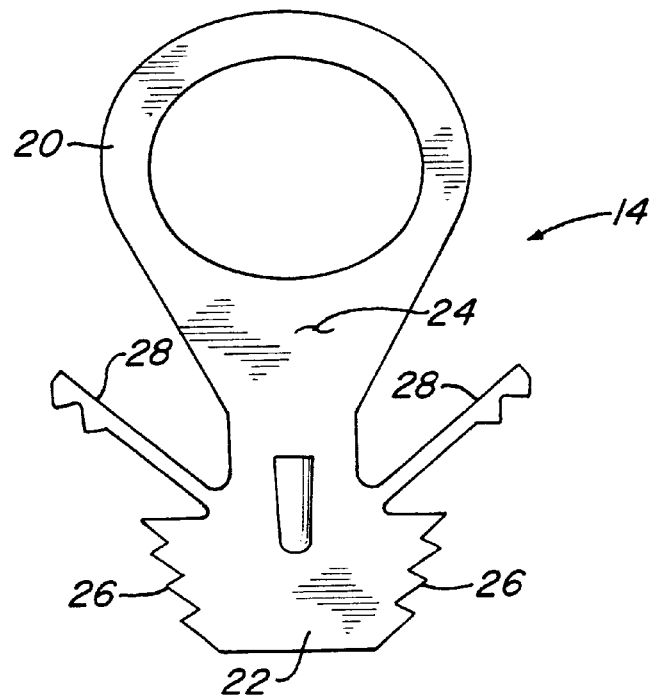
FIG. 2 is a front view of a prior art slide for a cord lock device.
Figure 3:
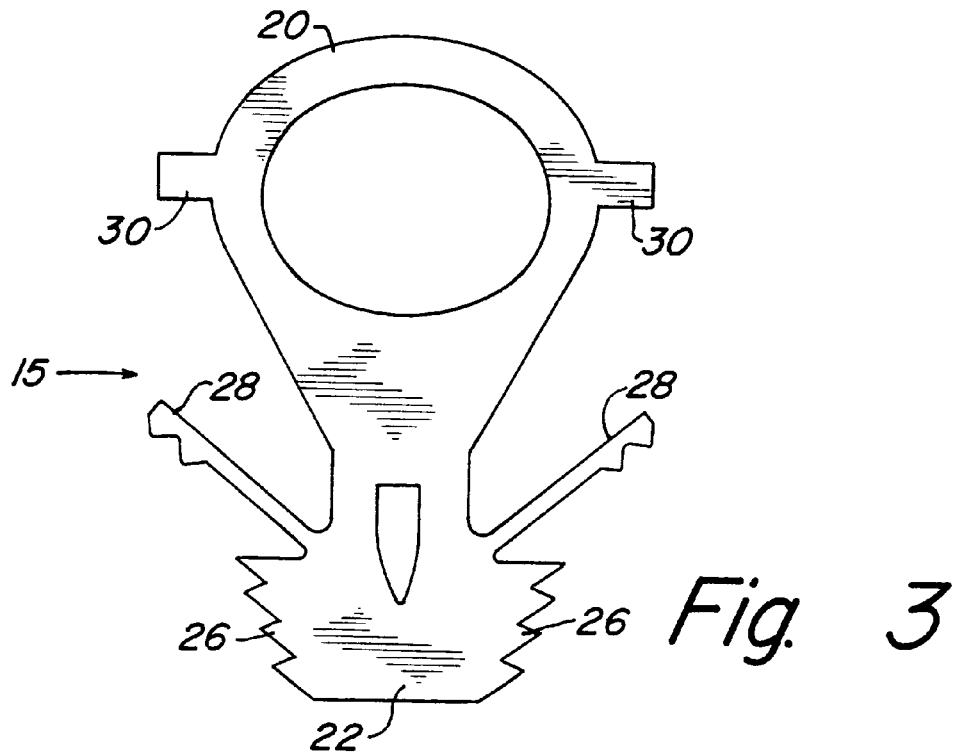
FIG. 3 is a front view of an improved slide for a cord lock device according to the present invention.

FIG. 3 illustrates an improved slide in accordance with the present invention. The improved slide 15 is very similar in construction to the prior art slide shown in FIG. 2. The feeler arms 28 are optional, and the details of the gripping portions 26 may be varied as known in the art.

On either side of finger loop 20 is a projecting stopper arm 30. The stopper arms 30 provide an unyielding projection which prevents the slide 15 from being pulled into the lock body 12, even if significant pressure is applied to the slide.

Figure 4:
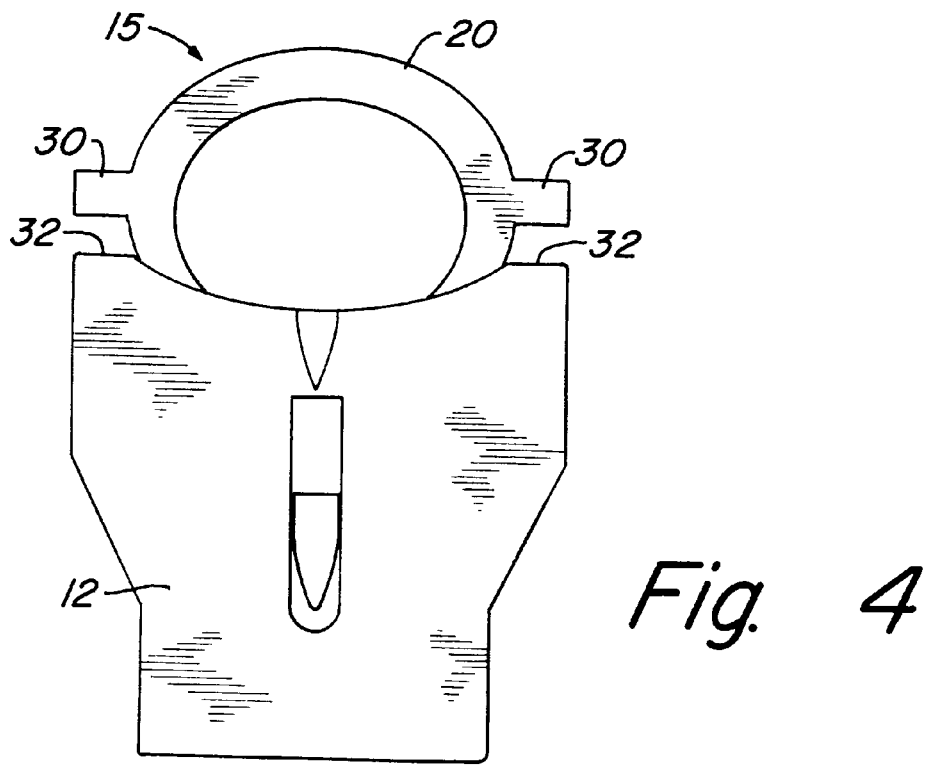
FIG. 4 is a front view of the improved cord lock device according to the present invention.

Operation of the stopper arms 30 to prevent the slide 15 from being pulled into the lock body 12 is shown in FIG. 4. It can be seen that the stopper arms 30 project to the sides far enough that they rest upon upper shoulders 32 of the lock body 12.

Figure 5:
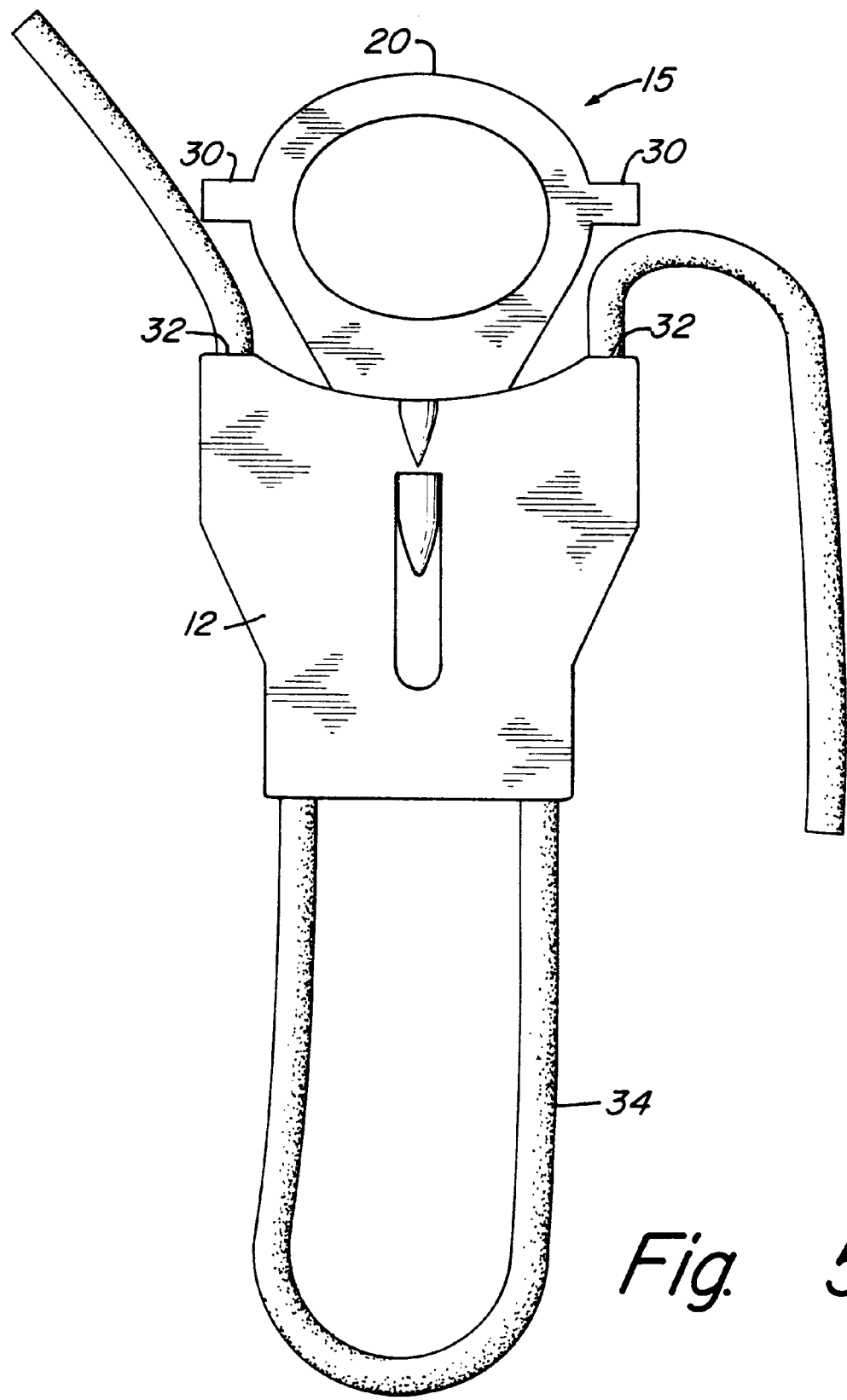
FIG. 5 is a front view of the cord lock of FIG. 4 illustrating locking of a cord.

FIG. 5 shows the improved cord lock used in conjunction with a cord 34.

Figure 6:
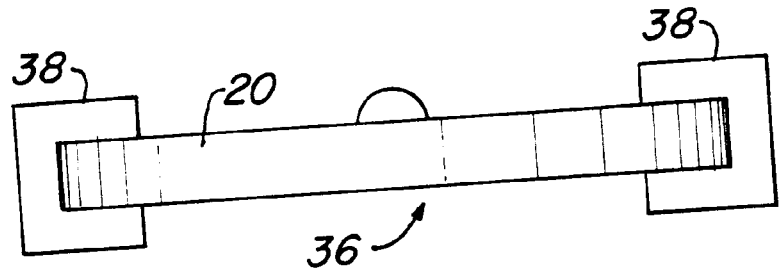
FIG. 6 is a top view of an alternative design for a slide.

FIG. 6 illustrates an alternative design for the improved slide 36 viewed from the top. The top of the finger loop is shown in FIG. 6, with stopper pieces 38 being located on each side thereof. The stopper pieces 38 operate in much the same manner as stopper arms 30, with the exception that they project forward and backward with respect to the slide, as well as out to the sides. If desired, the stopper pieces 38 can be made to project only forward and back, which is up and down as shown in FIG. 6, and not to project out to the side.

Figure 7:
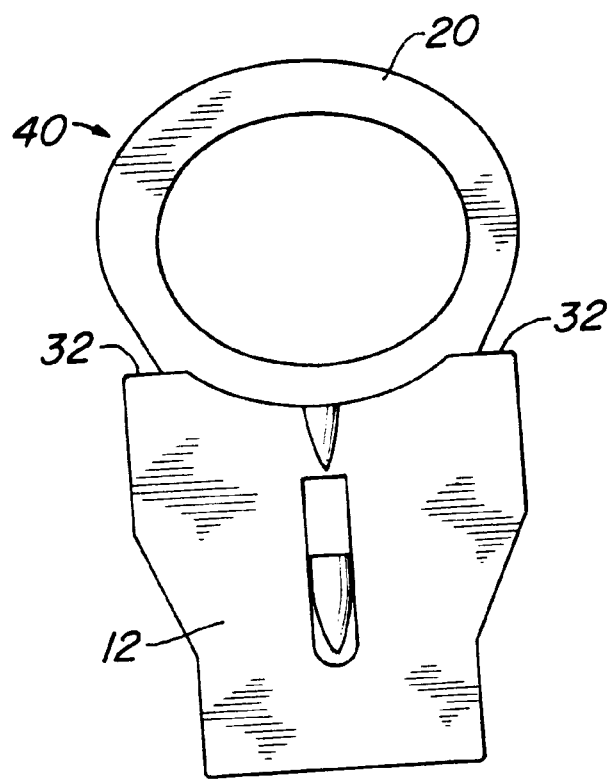
FIG. 7 is a front view of a second alternative slide design.

FIG. 7 shows another alternative embodiment of an improved cord lock. The improved cord lock of FIG. 7 does not have separate stopper arms, but instead utilizes a finger loop 20 which is substantially wider than designs currently used in the industry. The finger loop 20 is wide enough to engage the upper shoulders 32 of the lock body 12, and prevent the slide 40 from being pulled into the cord lock body 12. This alternative design has a feature which may be desirable or undesirable, depending upon the application. This feature is that the finger loop 20 is large relative to normal industry designs. This can be useful in that it makes it easier to grasp by user, but can in some circumstances result in a finger loop that is too large for the application.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A cord lock, comprising:

a body;

a slider having a first portion movably located partially within the body for frictionally engaging a cord passing therethrough, wherein the slider also has a finger loop projecting outside the body; and stop arms projecting from the slider outside of the body to engage an external portion of the body and prevent the slider from moving further into the body than a predetermined position.

2. The cord lock of claim 1, wherein the stop arms project laterally from the slider to rest on external shoulders of the body in the predetermined position.

3. The cord lock of claim 2, wherein the stop arms project laterally from the finger loop.

4. The cord lock of claim 1, wherein the stop arms project forwardly and rearwardly from the slider to rest on external portions of the body in the predetermined position.

5. The cord lock of claim 4, wherein the stop arms project laterally as well as forwardly and rearwardly.

6. A cord lock having improved safety, comprising:

a body;

a slider movably located partially within the body for frictionally engaging a cord passing therethrough, wherein the slider includes a finger loop outside of the body; and means located outside of the body for preventing the slider from being moved into the body beyond a preselected position.

7. The cord lock of claim 6, wherein the preventing means comprises at least one stop arm projecting from the slider, at a location outside the body, which rests on a selected external location of the body when the slider is in the preselected position.

8. The cord lock of claim 7, wherein the at least one stop arm comprises two stop arms which project from the finger loop.

9. The cord lock of claim 8, wherein the stop arms project forwardly and rearwardly from the finger loop.

10. The cord lock of claim 8, wherein the stop arms project laterally from the finger loop.

11. A cord lock having improved safety, comprising:

a body;

a slider movably located partially within the body for frictionally engaging a cord passing therethrough; and means located outside of the body for preventing the slider from being moved into the body beyond a preselected position;

wherein the slider includes a finger loop, and wherein the preventing means comprises the finger loop being formed wide enough to rest against upper portions of the body when the slider is in the preselected position.

12. A cord lock having improved safety, comprising:

a body;

a slider movably located partially within the body for frictionally engaging a cord passing therethrough, wherein the slider includes a finger loop outside the body; and means located outside of the body for preventing the slider from being moved into the body beyond a preselected position, the preventing means including two stop arms projecting from the finger loop to engage upper portions of the body.

13. The cord lock of claim 12, wherein the stop arms project laterally from the finger loop.

14. The cord lock of claim 12, wherein the stop arms project forwardly and rearwardly from the finger loop.

15. The cord lock of claim 14, wherein the stop arms also project laterally from the finger loop.

* * * * *